May 13, 1941. M. ROSENKRANZ 2,241,526
PIPE JOINT TESTER
Filed Sept. 12, 1939
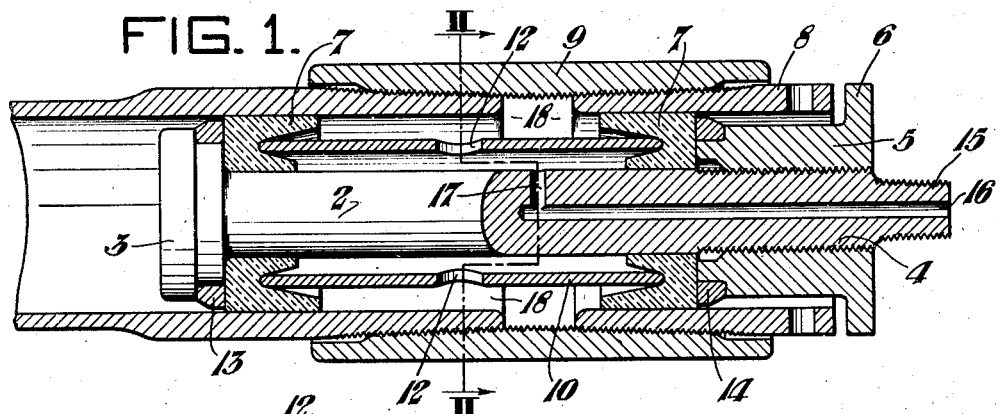
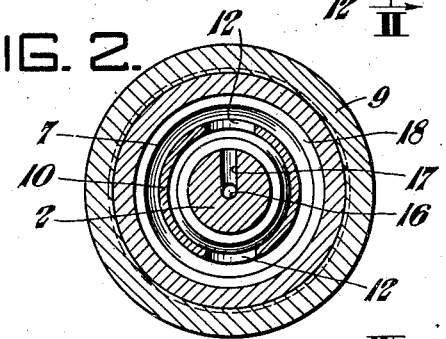
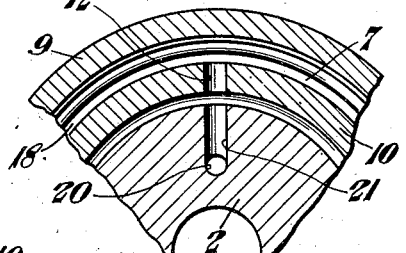
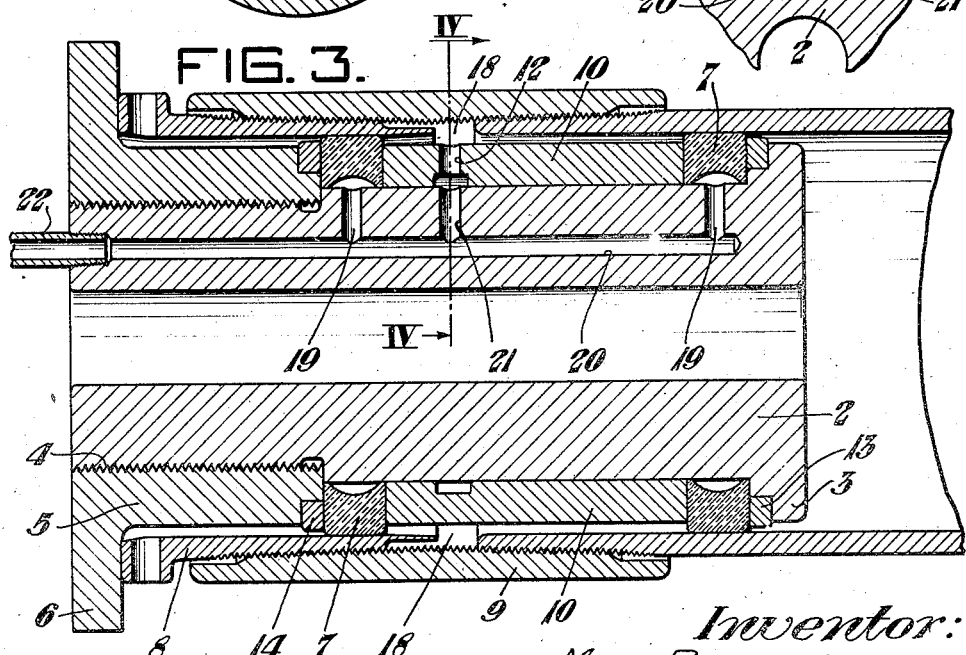
Inventor:
MAX ROSENKRANZ,
by: John E. Jackson
his Attorney.

Patented May 13, 1941

2,241,526

UNITED STATES PATENT OFFICE 2,241,526

PIPE JOINT TESTER

Max Rosenkranz, Bethel Township, Allegheny County, Pa., assignor to National Tube Company, a corporation of New Jersey Application September 12, 1939, Serial No. 294,565

4 Claims. (Cl. 138—90)

This invention relates to the testing of pipe joints for leakage and, particularly, to an improved apparatus or device for performing such tests.

Various means have been suggested and used for testing pipe joints for leakage, either before shipment of the pipes at the particular point of manufacture, or at their point of use after shipment. It is, of course, desirable that such pipe joints be tested at the place of manufacture in order that any defects therein may be corrected by the manufacturer before shipment to the user. Some of these testing means have been entirely satisfactory in their use but were difficult and expensive to maintain and use, while others were not effective and did not provide a good test for the joint.

A high pressure fluid means is usually employed to test such joints and, in some cases, the ends of the pipe to be tested were sealed and the fluid under pressure introduced into the pipe so as to test the pipe as well as the joints at the ends thereof, but this was not satisfactory, in that, the force used at the ends of the pipe to effect a satisfactory seal oftentimes damaged these ends, especially if the ends of the pipe were threaded.

According to the present invention, it is proposed to test merely the joint by confining the fluid under pressure solely to the joint area, thereby requiring only a relatively small amount of testing fluid and providing a test which is quicker and less expensive. Furthermore, in the present invention, a thread protector is provided during the testing of the joints which remains in the end of the pipes after the testing thereof, thereby acting as a means for protecting the ends of the pipe during all subsequent movements and the shipping thereof. Heretofore, the thread protectors were not inserted in the pipes until they were ready to be shipped.

It is one of the objects of the present invention to provide an improved, simple and inexpensive apparatus for testing pipe joints which can be easily and conveniently applied to the joint to be tested.

It is another object of the invention to provide an improved apparatus for testing pipe joints which reduces the time of testing to a minimum, and, at the same time, one that will effectively seal and test the joint at a minimum expense.

It is a further object of the invention to provide an improved apparatus for testing pipe joints in which the threaded ends of the pipe are fully protected with part of the apparatus remaining thereon to protect these ends after testing.

It is still another object of the present invention to provide an improved apparatus for testing pipe joints in which the testing fluid simultaneously acts to seal the joint and to test the same.

Various other objects and advantages of this invention will be more apparent in the course of the following specification and will be particularly pointed out in the appended claims.

In the accompanying drawing there is shown, for the purpose of illustration, one embodiment and a modification thereof which my invention may assume in practice.

In the drawing:

Figure 1 is a longitudinal section of the improved pipe joint tester of my invention;

Figure 2 is a section taken on the line II—II of Figure 1;

Figure 3 is a longitudinal section of a modified form of pipe joint tester of my invention; and, Figure 4 is a section taken on the line IV—IV of Figure 3.

Referring more particularly to the drawing, the embodiment of the improved pipe testing apparatus or device of my invention, as shown in Figures 1 and 2, comprises a cylindrical body member 2 having a flanged portion 3 arranged on the inner end thereof and an exteriorly threaded portion 4 arranged on the opposite outer end thereof. There is arranged on the threaded portion 4 of the body member 2 at the outer end thereof an interiorly threaded annular collar member 5 having an outwardly extending flanged portion 6 disposed on the outer end thereof.

There is disposed between the flanged portion 3 of the body member 2 and the inner end of the annular collar member 5 around the body member 2, a pair of annular pliable sealing members 7 having preferably substantially a U-shaped cross section with the channel portions thereof oppositely disposed from each other and with the outer leg thereof preferably longer than the inner leg. One of these annular members is adapted to be disposed opposite the inner wall of the pipe to be tested adjacent the end thereof and the other opposite the inner wall of a nipple-like protective member 8 positioned in the end of the coupling 9 arranged on the end of the pipe. The annular sealing members 7 are spaced apart preferably by means of an annular member 10 having preferably a plurality of holes 12 arranged therein and preferably centrally thereof with its edges disposed in the oppositely disposed channel portions of the annular sealing members 7.

There is also arranged around the body member between the end flanged portions 3 thereof and the annular sealing member 7 adjacent thereto, preferably, a ring member 13 having an outer diameter slightly less than the interior diameter of the pipe to be tested and there is arranged on the inner end of the annular collar member 5, next to the outer wall of the sealing member 7 adjacent thereto, a similar ring member 14 having an outer diameter slightly less than the inner diameter of the nipple-like protective member 8. It is the purpose of these ring members 13 and 14 to prevent the annular sealing member 7 from being extruded between the respective inner walls of the pipe and nipple-like insert when the fluid test pressure is applied.

There is disposed preferably on the extreme end of the body member 2, an exteriorly threaded portion 15 which is adapted to receive a connection for supplying a testing fluid to the joint through a passageway 16 preferably arranged axially of the body member 2 and passageway 17 communicating with the space 18 between the sealing members 7 in the vicinity of the joint.

The improved pipe testing device or apparatus of my invention is used in the following manner:

It will be understood that the pipe to be tested has a coupling 9 arranged on the end thereof and there is arranged in the outer end of the coupling a nipple-like protective member 8. The above described assembly is inserted through the nipple-like protective member 8 into the end of the pipe so that the annular sealing member 7 on the inner end thereof is disposed opposite the inner wall of the pipe adjacent the end thereof and the other sealing member 7 disposed opposite the inner wall of the nipple-like protective member 8. The annular collar member 5 is tightened so as to slightly spread the annular sealing members 7 so that the assembly fits snugly within the nipple-like protective member and the end of the pipe. The connection from the source of supply of the testing fluid under pressure is then arranged on the threaded end portion 15 of the body member. The testing fluid is then introduced therethrough to the space 18 between the sealing members 7 through the passageways 16 and 17 and through the openings 12 in the annular member 10. After a sufficient quantity of testing fluid has been introduced to the space 18, the longer outer leg portions of the sealing members 7 are forced outwardly thereby against the respective inner walls of the pipe and the nipple-like protective member, thereby sealing the joint, and the test is continued by maintaining a constant pressure of the testing fluid to the joint. After the joint has been tested, the testing fluid supply connection is disconnected and the annular collar member 5 is backed-off slightly so as to relieve the pressure of the sealing members 7 against the inner walls of the pipe and the protective member. The assembly is then removed from the end of the pipe and inserted in the next pipe to be tested, as described.

It will be seen that this type of tester can be used for testing pipe joints of various sizes within a given range merely by changing the backing-up rings 13 and 14, and in some cases the gaskets 7.

The embodiment of my invention as shown in Figures 3 and 4 of the drawing is similar to the embodiment of the invention above described and as shown in Figures 1 and 2, but the sealing members differ slightly in their construction and sealing action. In this embodiment, the sealing members 7 are substantially U-shaped in cross section with the base or periphery thereof of one of them disposed opposite the inner wall of the pipe adjacent the end thereof and the other opposite the inner wall of the nipple-like protective member 8 as before. The channel portions of the sealing members are arranged around the cylindrical body member 2 opposite passageways 19 arranged in the periphery thereof which communicate with a longitudinally extending passageway 20 arranged in the body member. The passageway 20 also communicates with a passageway 21 which communicates with the openings 12 arranged in the annular member 10 which, in turn, communicate with the space 18 between the annular sealing members 7.

The test of the joint with this apparatus is made substantially in the same manner as that of the first embodiment and as described. However, in this construction, the testing fluid under pressure is introduced into the passageway 20 through a testing supply pipe 22 connected to the outer end thereof and passes therefrom through the passageway 19 into the channel portions of the sealing members 7, expanding them and forcing them against the respective inner walls of the pipe and the nipple-like protective member, thereby sealing the joint. The testing fluid simultaneously passes from the passageway 20 through the passageways 21 and 12 into the space 18 between the sealing members 7 to test the joint.

It will be understood that, in both embodiments, the nipple-like protective member 8 is permitted to remain in the end of the coupling after the test and is adapted to act as a protector for the coupling and the threaded end of the pipe during subsequent movement and shipment thereof.

While I have shown and described one embodiment of my invention and a modification thereof, it will be understood that these embodiments are merely for the purpose of illustration and description and that various other forms may be devised within the scope of my invention, as defined in the appended claims.

I claim:

1. Apparatus for testing pipe joints including, in combination, an interiorly threaded coupling member arranged on the end of the pipe to be tested, an exteriorly threaded nipple-like protective member adapted to be positioned in the outer end of said coupling, a cylindrical body member which is adapted to be arranged within the end of said pipe and nipple-like member, said body member having a flanged portion arranged on the inner end thereof and an exteriorly threaded portion on the opposite outer end thereof, an annular collar member arranged on the outer threaded end portion of said body member, a pair of annular pliable sealing members having an outer diameter less than the internal diameter of said pipe arranged within the same between the flanged portion of said body member and the inner end of said annular collar member, said annular sealing members being spaced apart with one of them adapted to be positioned opposite the inner wall of the nipple-like member and the other opposite the inner wall of said pipe adjacent the end thereof, means for spacing said annular sealing members from each other, means for hydraulically expanding each of said sealing members so as to force the same against the respective inner walls of said nipple-like member and said pipe, and means for introducing a fluid under pressure to the space between said sealing members to test the joint.

2. Apparatus for testing pipe joints including, in combination, a coupling member arranged on the end of the pipe to be tested, a nipple-like protective member adapted to be arranged in the outer end of said coupling, a body member, a pair of spaced annular pliable sealing members carried by said body member and adapted to be arranged within said pipe, one of said sealing members adapted to be disposed opposite the inner wall of said nipple-like protective member and the other opposite the inner wall of said pipe and adjacent the end thereof, fluid passageways arranged in said body member for introducing a testing fluid under pressure into the space between said sealing members at said joint and into recesses in said sealing members whereby said testing fluid is adapted simultaneously to force the sealing members outwardly against the respective inner walls of said nipple-like member and said pipe to seal the joint and to test the same.

3. Apparatus for testing pipe joints including, in combination, a longitudinally extending cylindrical body member adapted to be arranged within the pipe at the joint having a flange arranged on one end thereof and an exteriorly threaded portion arranged on the opposite end thereof, an interiorly threaded adjustable collar arranged on the exteriorly threaded end portion of the cylindrical body member, a pair of spaced apart annular pliable sealing members arranged around said cylindrical body member between the flange and collar with one disposed to either side of the joint, said collar adapted to be adjusted on the cylindrical body member whereby the annular sealing members are forced outwardly so that the apparatus is held securely in the pipe opposite the joint at the start of the testing operation, and means for introducing a testing fluid under pressure into and through said cylindrical body member whereby said testing fluid is adapted to expand and force said annular sealing members outwardly against the inner walls of the pipe to seal the joint and simultaneously to test the same.

4. Apparatus for testing pipe joints including, in combination, a coupling arranged on the end of the pipe to be tested, a nipple-like protective member arranged in the outer end of said coupling, a cylindrical body member arranged within said nipple, coupling and pipe, having a flange arranged on the inner end thereof and an exteriorly threaded portion arranged on the outer end thereof, an interiorly threaded adjustable collar arranged on the exteriorly threaded end portion of said cylindrical body member, a pair of spaced apart annular pliable sealing members arranged around said cylindrical body member between the flange and collar with one sealing member arranged opposite the inner wall of said nipple-like protective member and the other opposite the inner wall of the pipe adjacent the end thereof, said collar adapted to be adjusted on said cylindrical body member whereby said annular sealing members are forced outwardly so that the apparatus initially fits snugly within the nipple-like protective member and the end of the pipe, and means for introducing a testing fluid under pressure into and through said cylindrical body member whereby said testing fluid is adapted to expand and force said annular sealing members outwardly against the respective inner walls of said nipple-like member and said pipe so as to seal the joint and simultaneously to test the same.

MAX ROSENKRANZ.